United States Patent [19]
Perot

[11] 3,803,603
[45] Apr. 9, 1974

[54] METHODS OF DETECTION OF AIR, SPACE OR SUBMARINE TARGETS BY REFLECTION OF ELECTROMAGNETIC OR ACOUSTIC WAVES

[76] Inventor: Jean Baptiste Gilbert Perot, 17 rue de Beauvau, 78 Versailles, France

[22] Filed: Aug. 1, 1972

[21] Appl. No.: 276,943

[30] Foreign Application Priority Data
Aug. 13, 1971 France .............................. 71.30066

[52] U.S. Cl. ................. 343/7 A, 343/7.5, 343/11 R
[51] Int. Cl. ............................................. G01s 9/06
[58] Field of Search .................... 343/7 A, 7.5, 11 R

[56] References Cited
UNITED STATES PATENTS
3,343,160 9/1967 Beals et al. .......................... 343/7 A
3,413,633 11/1968 Lehmann .............................. 343/10
3,618,086 11/1971 Van Staaden ........................ 343/7.5

*Primary Examiner*—T. H. Tubbesing
*Attorney, Agent, or Firm*—Flynn & Frishauf

[57] ABSTRACT

A method of detection of air, space or submarine targets by reflection of electromagnetic or acoustic waves, comprising performing two successive scanning operations, the scanning operations including a first "search" scanning operation wherein all of the points in a scanned area are rapidly scanned, the points being scanned in the first scan having a relatively high probability of false alarm. The scanning operation includes a second "identification" scanning operation wherein only points which are the true or false targets resulting from the first scan are fixed upon during the second scan, thereby improving the detection reliability of the system.

9 Claims, 6 Drawing Figures

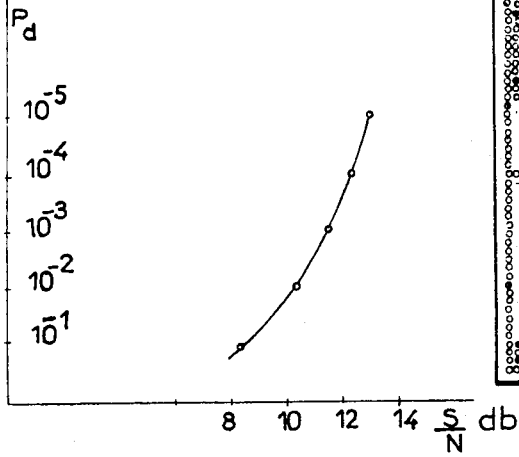
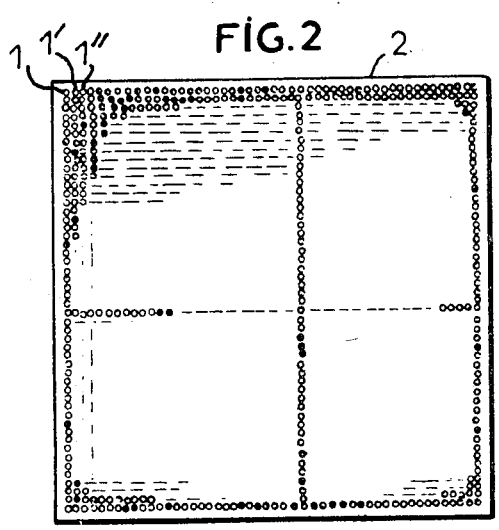
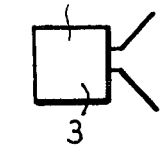
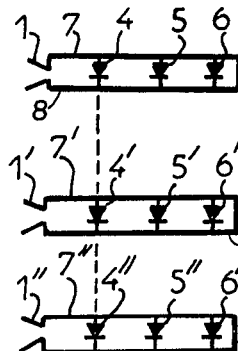
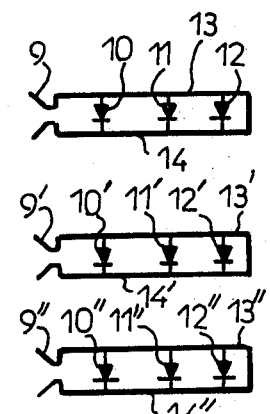
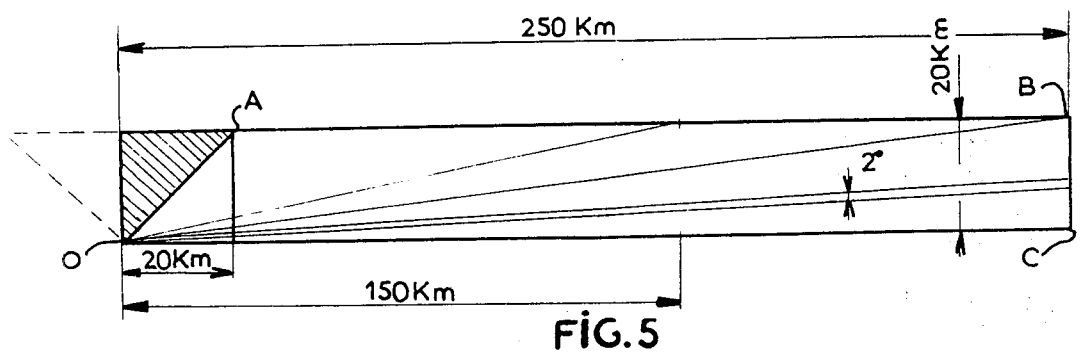

METHODS OF DETECTION OF AIR, SPACE OR SUBMARINE TARGETS BY REFLECTION OF ELECTROMAGNETIC OR ACOUSTIC WAVES

BACKGROUND OF THE INVENTION

The present invention concerns a method of detection of air, space or submarine targets by reflection of electromagnetic or acoustic waves.

It is known, for example, that electromagnetic or radar detection units comprise either a directional aerial used both for the transmission of pulse sequences and for the reception of the echoes reflected by the target, or two separate aerials for transmission and reception by means of which the area under surveillance is scanned. In both cases the direction in which the scanning pulse sequence is transmitted must remain inside the reception diagram throughout the time required for the return of the echos from the most distant targets, which is equal to $2R/c$, where R is the distance of the furthest target and $c$ is the speed of light. This results in a substantial limitation of the speed of movement of the aerial beam and therefore an increase in the length of time required to obtain the results of the scanning.

PRIOR ART

Increasing the speed of scanning the area under surveillance by the aerial or aerials by a known method consists in scanning an area of known range by means of the aerial transmission beam by making this beam scan the successive points to be scanned and making the aerial beam return on to these points for the reception of the echos after an interval corresponding to that of the signal's return journey. If two separate transmission and reception aerials are available the method consists in making the reception beam come onto the points previously reconnoitred by the transmission aerial after an interval corresponding to the return journey of the signal after transmission, the angular displacement of the two aerials being able to be modified in terms of the distance of the scanned sector of the area.

During the two successive scans of the area under surveillance by the aerial beam or beams, i.e.,: during transmission of the pulses and during reception of the echo, the beam is kept on the successive points scanned for an interval corresponding to that of one pulse, i.e.,: the length of time during which a target is "reconnoitred" by the transmission aerial beam. All the available time apart from these brief moments is used to scan other directions, which theoretically enables the scanning speed to be considerably increased and therefore the length of the scanning cycle to be decreased.

However, in this method, as in all radar scanning, the transmission aerial must send, in each direction where there may be a possible target, an amount of energy sufficient for the receiver to be able to distinguish with certainty an actual target from a point of noise, that is for the probability of a false alarm to be sufficiently small, e.g., $10^{-5}$. The operation will therefore be possible in an allowable information renewal time only if the power transmitted is relatively high.

OBJECT OF THE INVENTION

The object of the method according to the present invention is to remedy this drawback.

BRIEF SUMMARY OF THE INVENTION

According to the invention, detection is carried out in two phases, the first scan known as the search phase comprising rapidly scanning all the points of the area under surveillance and being satisfied with a relatively high probability of false alarm, whilst during a second scan, called the identification phase, the signal durations corresponding to the different range sectors are longer than during the search phase, or else the scanning of each range sector is repeated a greater number of times, to obtain an acceptable small probability of false alarm. In addition, in the identification phase, the aerial beam is fixed only in the directions in which the search phase has revealed the presence of a true or false echo, the aim of the identification phase being to eliminate the false echos. This method can be used with reference or not to scanning of the area by range sectors.

EXPLANATION

In the case of the invention, in the so called search phase, an abnormally high probability of false alarm can be accepted, e.g., $10^{-1}$; the power transmitted may be very much lower, but it will result in detecting not only actual targets, but also a very high number of false targets corresponding to points of noise. However, in the second scanning phase, known as "identification" the duplexer or the transmission aerial and reception aerial will be pointed successively for the necessary time in the direction previously detected corresponding to the true or false targets, but remaining longer on each of these targets, either with longer pulses or more of them, so as to obtain the probability of false alarm without increasing the power transmitted. In certain cases it will be beneficial for this second scan to adopt a probability of false alarm which is still insufficient, e.g., $10^{-3}$, and to repeat the operation for a third time in order to have a satisfactory probability of false alarm.

It is indeed known that for a transmission of particular power and duration, a particular signal/noise (S/N) ratio is obtained on a particular target, but by proper selection of the reception threshold a fixed probability of detection $P_d$ can be obtained: the probability of false alarm then depends on S/N. FIG. 1 of the accompanying drawing shows a graph for a probability of detection $P_d = 0.95$ based on that given in the article "Nomogram determines probability of Detecting Signals in Noise" from the Magazine Electronics vol. 34, No. 11; this graph gives the variations of probability of false alarm $P_{fa}$ in terms of the db values of S/N.

The S/N ratio itself depends on the power transmitted, but it is also proportional to the pulse duration, and to an adjoining power of half the number of pulses so that S/N can be increased without increasing the power, either by keeping the beam on the target for longer or by returning to it several times.

The combination of the two phases, search and identification, will take very much less time that if the search phase has been carried out right away with a satisfactory probability of false alarm, e.g., $10^{-6}$ and therefore with a suitably long immobilisation time in the direction of each target because the "identification" phase only covers a number of target directions which is reduced by the first very rapid search scan.

The pulse duration which, as well as being seen further, can be variable depending on range, is always calculated in microseconds so that if the area under surveillance is scanned by successive shifts of a few degrees (e.g., 2°) of the aerial in azimuth and elevation, speeds of movement of the aerial beam are reached which cannot practically be obtained by mechanical means.

FURTHER FEATURES OF THE INVENTION

Also according to the invention a phased array can be used for scanning in a way already known, consisting of a large number of radiating sources regularly distributed, e.g., on the surface of a rectangle, and fed by electromagnetic oscillations of the same frequency, but the phase of which varies from one source to the other, the phase distribution determining the direction of the resultant beam; by modifying the phase ratio between the different sources according to a pre-established program, it is possible to shift the direction of the resultant beam at very high speed.

For practical applications of the invention the area of space scanned is divided, in a way already known itself into range sectors, and the duration of the signal at each elevation and azimuth position of the aerial beam is adapted to the range of the corresponding sector, this interval being so much higher as the range is greater in order to obtain an adequate probability of detection. Similarly, each range sector can be scanned several times by the aerial beam in order to improve detection by one or other of the known integration methods, in particular by the detection method known as double threshold.

In each of the two phases the double threshold method of target detection can be used. Several pulses are successively transmitted onto the same point and the return signals having passed the first threshold are called echos; the presence of a target is decided if a fixed number of echos has been obtained.

The values of the two thresholds can moreover be different according to the range of the sector scanned.

Owing to a first very rapid scan which limits the number of points to be identified, the beam can remain longer on each true or false target during the identification stage by improving its performance owing to the increase in total energy transmitted towards each target, without thereby decreasing the information renewal frequency, i.e.,: the number of times per unit of time that a particular target is "seen" by the radar.

One way of carrying out the method according to the invention, as well as apparatus for its implementation, has been described below and illustrated in the drawings.

BRIEF DESCRIPTION OF DRAWINGS

FIG. 1 is a graph mentioned above showing the probability of detection in terms of the S/N ratio.

FIG. 2 is a diagrammatic front view of a phased array.

FIGS. 3 and 4 are diagrammatic elevations of a transmitting aerial and a receiving aerial.

FIG. 5 is a diagram representing the radial section of an area of space under surveillance by the radar.

DESCRIPTION OF ILLUSTRATED EMBODIMENT

Figure 6:
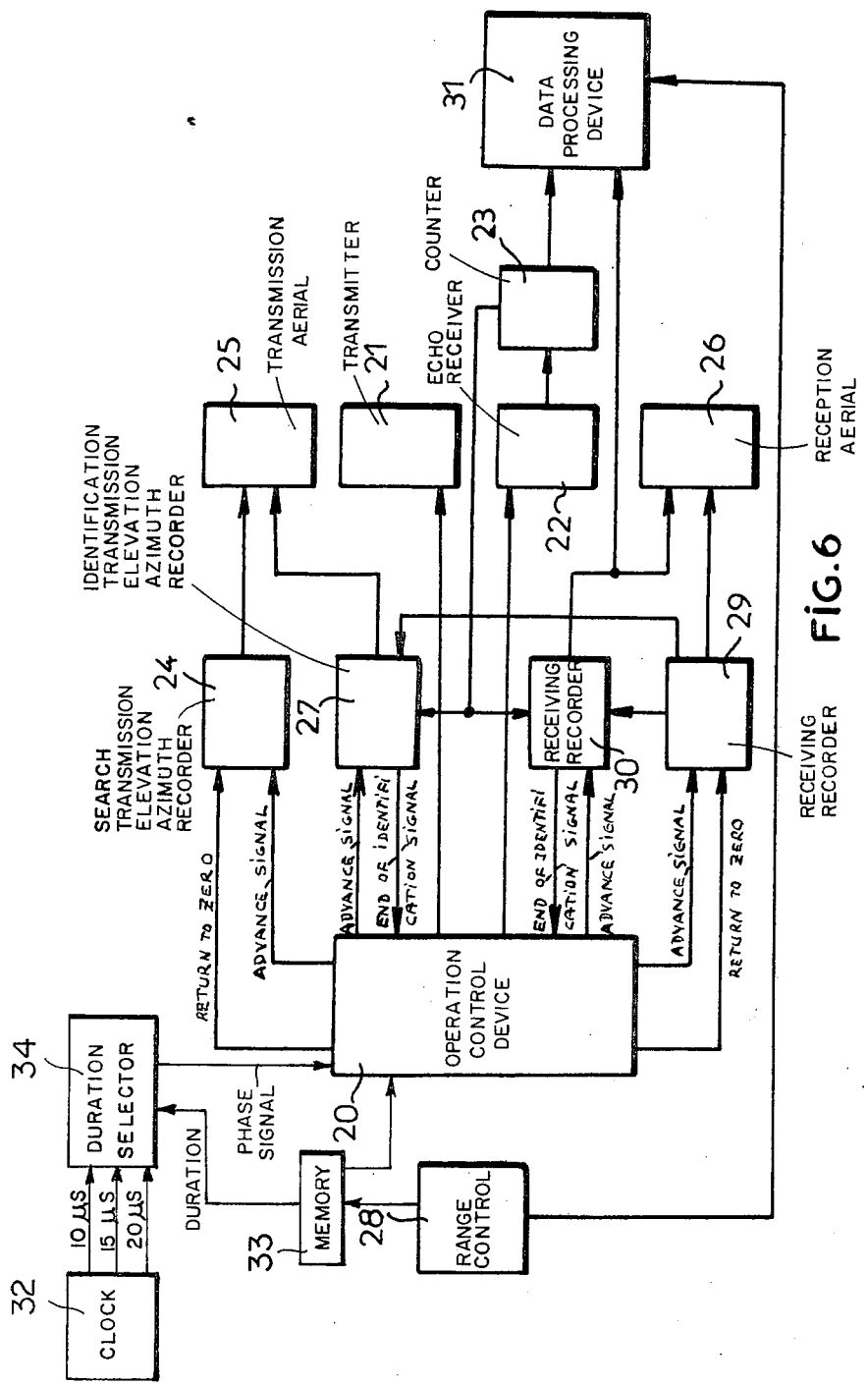
FIG. 6 represents in block diagram form the installation enabling the aerial shift control to be secured according to the method of the invention.

As an example FIGS. 2 to 4 represent a phased array which may be used for the implementation of the invention to provide detection probability characteristics as shown in FIG. 1. This aerial, transmitting on a wavelength of about 25 cm, comprises 2,500 separate sources of radiation 1, 1', 1''. . . distributed over the surface of a square 2 of side dimension of about 7.5 m, in lines and columns each comprising 50 sources with a space between sources of 15 cm, i.e.,: two thirds of the wavelengths used. For example, in the case of a radar with a power of 12.5 kw, each source will have a power of 5 watts and can be fed by an independent transmitter comprising, for example, a diode oscillator feeding a transistorized amplifier via a phase shift circuit, or else by a common transmitter with a suitable tube (magnetron or klystron). In the example shown in FIG. 3, the radiation is produced by a single tube transmitter 3 and reflected by the elemental sources 1, 1', 1''. . . each comprising a reflecting and phase shift device formed by switching diodes such as 4,5,6 . . . fitted in parallel between the conductors 7,8 of a short-circuit transmission-line at its end opposite the radiating element 1. The distance between diodes determines the pitch of the possible phase differences and the phase shift varies according to the diodes which are polarized, this polarization of the diodes being controlled, as will be explained further on, by a phase control device sending a signal representing a binary number to the corresponding source.

The receiving aerial shown in FIG. 4 has the same form, the elemental aerials 9, 9', 9''. . . fitted with their dephasing circuits 10,11,12 . . . 10',11',12'. . . 10'',11'',12''. . . fitted between the lines 13–14, 13'–14', 13''–14'', sending back the signals received to a receiver 15.

As an example of an embodiment of the invention the case will be taken of an air traffic control radar called upon to monitor a zone stretching over 120° in azimuth, over a height of 20 km and over a horizontal range of 250 km, with a 45° shaded cone of silence around the station located at 0. The aerial beam must therefore be moved over a zone of 120° in azimuth for each elevation value, the maximum value of which is dependent on the range. A section of the space scanned is represented by OABC (FIG. 5). If the aerial beam shifts discontinuously by 2° increments in both the azimuthal and elevation directions, the number of its azimuth positions, for a zone 120°, will be 60 whatever the range, while the number of elevation positions will be 23 for the minimum range of 20 km (the elevation varying for this range from 0, to 45,', or a total of 1,380 positions, and 3 only for the maximum range of 250 km or 180 positions in all.

The range will be divided into zones, for example of 20 km to 72 km, of 72 km to 96 km, of 96 km to 114 km of 114 km to 126 km, of 126 km to 144 km, of 144 km to 210 km and of 210 km to 250 km.

The pulse duration in each position of the beam shall be chosen in each range zone so as to have an adequate signal-noise ratio. For example, to have a signal-noise ratio of 3.2 for a range of 150 km with the rated power of 12.5 kw and a target of 1 m², this duration will be 30 microseconds. The value of this ratio varying proportionally to the fourth power of the ratio of the ranges, the pulse duration will be 15μs for the zone between 114 km to 126 km, and 10μs for ranges lower than 114 km which enables accuracy to be increased in range measurement for the low ranges for which accuracy is obviously more important.

These range zones are subdivided into range sectors which are successively scanned by the aerial beam. If t is the pulse duration, $\Delta R$ the depth of the range sector, c the speed of light, the equation $\Delta R = tc/2$ enables the depth of the range sectors in the above indicated range zones to be calculated: between 20 km to 114 km a depth of 1.5 km (or 63 sectors) is obtained, between 114 km to 126 km a depth of 2.5 km (6 sectors), and between 126 km and 250 km a depth of 4.5 km (28 sectors).

In order to obtain an adequate probability of detection, each range sector scanned will be scanned several times by the transmitter beam, the receiver beam being moved into the same sectors with a delay of $2R/c$ over the transmitter beam (R being the range, and c the speed of light) and remaining in each position for a duration equal to that of the pulse transmitted by the transmitter beam. The calculation shows that to obtain a total (i.e.,: during the search phase and the identification phase) probability of detection (see FIG. 1) of the order of 0.9, and a probability of false alarm of the order of $10^{-4}$ for distances of more than 100 km and of $10^{-5}$ for distances of between 20 and 100 km, it is necessary to adapt, for the different range zones, pulse durations and numbers of scans for the successive zones as follows:

SEARCH PHASE

Zones of 20 km to 72 km and of 72 km to 96 km: 1 scan with a pulse duration of 10μs.

Zone of 96 km to 114 km: 2 scans with a pulse duration of 10μs.

Zone of 114 km to 126 km: 2 scans with a pulse duration of 15μs.

Zones of 126 km to 144 km and of 144 km to 210 km and of 210 km to 250 km: 2 scans with a pulse duration of 30μs.

Identification Phase

This identification phase will not occur in the first 20 km to 72 km zone in which the data indicated above enable a satisfactory probability of false alarm to be obtained.

Zone of 72 km to 96 km: 6 scans with a pulse duration of 10μs.

Zone of 96 km to 114 km: 14 scans with a pulse duration of 15μs.

Zone of 114 km to 126 km: 14 scans with a pulse duration of 15μs.

Zones of 126 km to 144 km, 144 km to 210 km and 210 km to 250 km: 14 scans with a pulse duration of 30μs.

Of course the above figures are given as non-limitative examples and can be modified to meet particular conditions of use. In particular, the number of positions of the beam for each range sector can be increased. Similarly, modifications to the pulse duration and to the number of scans of the beam in each sector can be further diversified, while taking into account variations of the factor $1/R^4$ determining the signal-noise ratio, so as to achieve a saving of time and of extra energy.

In addition it can be seen that the above figures have been calculated by allowing that, for each beam position, the target is on the axis of the latter and at a range corresponding to the middle of the range sector in question. If the position of the target moves from this position, the probability of detection is diminished: in order to reduce this diminution, in the successive scans of each sector the beam can be shifted in elevation and azimuth by a fraction of its aperture angle and by modifying the pulse duration by an amount corresponding to a fraction of the range section in question.

The radar control installations unit which enables the invention method to be implemented will now be described. The various component parts of this installation have been shown in FIG. 6 by blocks and will not be described in detail because their production and operation are part of well known techniques, particularly in the field of electronic computers.

The essential part of this installation comprises an operation control device 20 controlling the movements of the aerial beams and the transmission of the pulses according to a fixed programme taking into account conditions of use which have been explained above. This operation control device is connected to the search-transmission-elevation-azimuth recorder 24 and the identification-transmission-elevation-azimuth recorder 27, and to the corresponding receiving recorders 29 and 30, as well as to a range control device 28. The two reception-elevation-azimuth recorders 29, 30 control respectively a phase control device of the transmission aerial 25 and a phase control device of the reception aerial 26. A signal counter 23 is connected on the one hand to the output of the echo receiver 22 and on the other hand to the reception and identification recorders 30 and 27, respectively, as well as to a data processing device 31. Elements 24, 27, 29 and 30 are preferably in the form of shift registers, controlled by operation control device 20 and counter 23 to provide incremented shifting of the aerial beam.

The operation control device 20 is associated with a clock 32 which can produce pulses having a duration of 10, 15 or 30 microseconds, and with a memory 33 in which the operation parameters relating to the various distances have been recorded (duration and number of pulses, value of the two reception thresholds etc...). Clock 32 and memory 33 are connected to the operation control device 20 through a duration selector 34. The threshold values are transmitted to the operation controller 20 by the memory 33.

For the search the operation control device transmits the transmission signal of the duration provided for depending on the range to the transmitter 21. At the end of each sequence it sends to the transmission-search-elevation-azimuth recorder 24 the change of position signal of the beam which makes this recorder advance with a view to shifting the beam by one step. When the number of positions provided for at the range in question is reached it sends it the return to 0 signal. If it is intended to send several pulses in the same direction, it restarts the same operations (transmission of pulse and change of position signals) on the range sector in question as many times as necessary.

When all the positions of the sector have been covered by the beam the number of times provided for, the operation control device 20 isolates the output of the transmission-search-elevation-azimuth recorder 24 in the direction of the transmission phase control device and releases that of the transmission-identification-elevation-azimuth recorder 27 and produces the pulses intended for the identification according to an analogous process by making the recorder advance after each pulse. When the transmission identification recorder 27 is empty, it sends a signal to the operation control device which then releases the search-transmission recorder and advances the range control device 28 by one unit. The operations described then start again for a new range sector.

Each time that the operation control device 20 has sent a change of position signal to one of the transmission recorders 24, 27 after a time $2R/c$ rounded to one of the periods generated by it, it sends a change of position signal to the corresponding reception recorder, i.e.,: to the reception-search-elevation-azimuth system 29 or to the reception-identification-elevation-azimuth system 30; with the same delay it controls the values of the receiver and the signal counter thresholds.

The range control device 28 comprises a recorder of the range sectors mentioned above starting with the smallest, the value of these sectors varying from 1.5 km to 4.5 km. This range recorder advances one unit every time the operation control device has finished the sequence relating to a particular range. The range control device 28 distributes the value of the range to the other elements in binary numbers owing to which the operation control device 20 imposes the value of the operation parameters kept for this range (duration and number of pulses, value of the two reception thresholds).

The transmission-search-elevation-azimuth recorder 24 on the one hand and the reception-search-elevation-azimuth recorder 29 on the other hand include in their memory the list of all the possible positions of the beams in the order of the 60 azimuths at the lowest elevation, then of the 3° elevation up to the 45° elevation. The successive signals from the operation control device produce the successive positions of the beam and, for each position, the binary number indication of the azimuth and elevation is transmitted by each of the transmission recorders 24, 27 and the reception recorders 29, 30 to the corresponding phase control devices of aerials 25 and 26. The search recorders are returned to 0 at a particular elevation depending on the range, on a special signal from the operation control device. Thus, the possible number of elevations depends on the range, the angle to be covered being arc tg $20/R$.

The transmission-identification-elevation-azimuth recorder 27 on the one hand and the reception-identification-elevation-azimuth recorder 30 on the other hand record during the search phases of each range sector the azimuth and elevation values of the targets effectively detected and held in the course of the search. For this purpose recorders 27 and 30 constantly receive the azimuth and elevation values of the search reception recorder 29, but only register them in the presence of a signal from the signal counter 23. When for a particular range sector the search phase is completed, the outputs of these recorders 27 and 30 are released by the operation control device 20 in order to carry out identification. They each control respectively the phase control devices of transmission 25 and reception 26 aerials. When the identification transmission recorder 27 is empty it sends to the operation control device 20 the end of identification signal for the range sector and it is refilled during the search phase of the following sector.

The function of the signal counter 23 is to send a presence of echo signal either to the two identification-elevation-azimuth recorders 27, 30 or to the data processing system 31 connected to the radar in the identification phase. It counts the number of echos passing the first threshold and gives the echo signal if they are at least equal in number to the threshold recorded in the operation control device. In the case of the search the threshold is always 1 and all the echos recognized are sent to the two identification-elevation-azimuth recorders.

The data processing system 31 constantly receives the range from the range control devices, the azimuth and the elevation from the identification reception recorder, but it will only take them into account in the presence of the presence of echo signal.

I claim:

1. A method of detection of air, space or submarine targets by reflection of electromagnetic or acoustic waves, comprising performing two successive scanning operations, said scanning operations comprising a first "search" scanning operation including rapidly scanning all the points of the scanned area, accompanied by a relatively high probability of false alarm, and a second "identification" scanning operation including fixing upon only points which are the true or false targets resulting from the first scanning operation, thereby improving the detection reliability.

2. A method of detection according to claim 1, comprising dividing the scanned area of space into range sectors and setting the transmission duration of the signal at each elevation and azimuth position of the aerial beam in accordance with the range of the corresponding sector, said transmission duration being sufficiently higher in relation to the greater range as to obtain an adequate probability of detection.

3. A method of detection according to claim 2, comprising, during the identification scanning, scanning with signals whose transmission durations corresponding to the different range sectors are longer than those signals used during the search scanning.

4. A method of detection according to claim 1, comprising scanning each range sector several times by the aerial beam, the number of scans becoming higher as the range increases.

5. A method of detection according to claim 4, comprising repeatedly scanning each range sector a greater number of times during the identification scanning than during the search scanning.

6. A method according to claim 1, for the case of a monitoring radar intended for air traffic control around an airport, with a space limited to 120° in azimuth, 20 km in altitude and 250 km in range, comprising scanning said space by means of a beam having an aperture of 2° and which is shifted discontinuously by increments of 2° in both azimuth and elevation.

7. A method according to claim 1, wherein the range sectors of increasing values successively scanned by the aerial beam are divided into range zones of 20 to 72 km, 72 to 96 km, 96 to 114 km, 114 to 126 km, 126 to 144 km, 144 to 210 km and 210 to 250 km, comprising scanning during the search scan once in the first two zones with a pulse duration of 10 microseconds and twice in the succeeding zones with pulse durations of 10 microseconds in the third zone, 15 microseconds in the fourth zone and 30 microseconds in the last four zones, and scanning during the identification scan, which does not take place in the first zone, six times in the second zone with a pulse duration of 10 microseconds and fourteen times in the succeeding zone, the pulse durations being 10 microseconds for the third zone, 15 microseconds for the fourth zone and 30 microseconds for the last three zones.

8. Apparatus for detection of air, space or submarine targets by reflection of electromagnetic or acoustic waves, by means of successive "search" and "identification" scanning operations, comprising:

an operation control device including a clock for producing pulses with durations corresponding to various range sectors and a memory in which are stored the parameters relating to the scanning of said various range sectors, said parameters including at least one of the pulse duration, number of scans and the reception threshold values, a transmitter for receiving from said operation control device a transmission signal having a duration depending on the range, two transmission-elevation-azimuth recorders and two reception-elevation-azimuth recorders assigned respectively to a search scanning operation and to an identification scanning operation, and for receiving aerial beam change of position signals from said operation control device, said reception recorders being controlled with a delay, with respect to the corresponding transmission recorders, equal to the time-length of the return trip of the signal, and a range control device, said operation control device sending, at the end of the sequence of operations relating to one sector, an advance signal to the range control device, said range control device including a recorder of the range sectors and which itself transmits to the operation control device, at each step forward, binary number values of the range sector to be scanned which determine the values of the operating parameters which the operation control device in turn distributes to other parts of the apparatus to which it is connected.

9. Apparatus according to claim 8, comprising:

a transmission aerial phase control device coupled to and controlled by said two transmission-elevation-azimuth recorders, a reception aerial phase control device coupled to and controlled by said two reception-elevation-azimuth recorders, said recorders controlling said phase control devices in accordance with the signals they receive from said operation control device, an echo receiver coupled to said operation control device, a signal counter coupled to the output of said echo receiver, the output of said counter being coupled to the transmission identification recorder and to the reception identification recorder for indicating the presence of an echo signal during the search scanning operation after counting the echos above a given detection threshold, and a data processing device receiving during the identification scanning operation the output signal from said counter, said data processing device being further permanently connected to an output of said range control device.

* * * * *

UNITED STATES PATENT OFFICE
CERTIFICATE OF CORRECTION

Patent No. 3,803,603           Dated April 9, 1974

Inventor(s) Jean Baptiste Gilbert PEROT

It is certified that error appears in the above-identified patent and that said Letters Patent are hereby corrected as shown below:

Page 1, in the heading change priority data to read:

--August 18, 1971     France..........71.30066--.

Signed and sealed this 10th day of September 1974.

(SEAL)
Attest:

McCOY M. GIBSON, JR.           C. MARSHALL DANN
Attesting Officer              Commissioner of Patents